United States Patent Office 3,290,231
Patented Dec. 6, 1966

3,290,231
METHOD OF INCREASING THE EVAPORATION OF WATER IN THE RECOVERY OF FRESH WATER AND SALT
Herman E. Ries, Jr., Chicago, Ill., and Joseph Gabor, Whiting, Ind., assignors to Standard Oil Company, Chicago, Ill., a corporation of Indiana
No Drawing. Filed May 11, 1962, Ser. No. 194,189
12 Claims. (Cl. 203—10)

This invention relates to a novel method for carrying out evaporating and/or distilling operations. More particularly, it relates to a method of increasing the evaporation of volatile liquids, especially at temperatures below the boiling point of liquid media comprising volatile liquids. It is especially useful in connection with the economical production of salt and fresh water from saline water by solar evaporation and will be illustratively described as employed for this purpose. However, as the description proceeds, it will become apparent that the invention can be used to advantage in many other types of distilling and evaporating operations.

Solar or atmospheric evaporation of liquid media is frequently utilized for the recovery of dissolved or suspended solids and/or for the recovery of volatile liquids from such media. Saline waters are frequently used as a source for the production of salt or for the conversion to fresh water by solar evaporation. In connection with the manufacture of salt from saline water, sea water is introduced into large evaporating ponds wherein the water is evaporated and the soluble salts contained therein are subsequently crystallized. For the production of fresh water from saline water, solar stills are utilized wherein the saline water is exposed to heat and the vaporized water is subsequently condensed. Likewise, evaporating ponds are used in the handling of industrial wastes. In such operations, the rate of vaporization of water is critical for production is based upon the amount of water that is evaporated per unit time.

It has been discovered that when the surface of liquid media undergoing evaporation is covered with a thin, floating layer of discrete, imperforate particles of an inert solid material, the rate of vaporization of volatile liquids in the liquid media is effectively increased at a given temperature over the rate of vaporization in the absence of said layer.

The particles used in the invention can be prepared from organic or inorganic materials. Each particle is a separate, unitary discrete entity having a density less than the liquid media with which it is in contact, an average diameter less than one centimeter, preferably less than 500 microns, and its surface preferentially wettable by the volatile liquid in the liquid media. For example, the surface of particles that are to be used with aqueous liquid media is preferentially wettable by water. The particles can be solid or hollow in nature. They should be imperforate so as to be non-absorbent to the liquids with which they are in contact. The composition of the particles is not critical so long as they are insoluble and inert with respect to the materials with which they are in contact, such as the liquid media and air. Particles that have been found to be suitable for use in the invention comprise particles formed from film-forming materials, which are hollow, predominantly hole-free, having a gas within and are very small. Such particles and method of making them are fully described in U.S. Patent 2,797,201. Other particles that can be used in the invention are described in U.S. Patent 2,929,106. The disclosures of these patents to the extent they describe these particles and the methods of making them is incorporated by reference. Briefly, these particles are micro-spheres obtained by spray-drying small globules of film-forming materials. The surface of particles of inorganic materials can be rendered wettable by treatment with appropriate surfactants. Other adjuvants, such as bactericides, fungicides, etc., can be incorporated in the materials or by subsequent surface treatment.

The thickness of the thin floating layer of particles found to be effective to increase the rate of vaporization of volatile liquids from liquid media is about one-quarter inch or less, preferably a sixty-fourth to one-quarter inch. Greater thickness than one-quarter inch, while not inoperative, does not give sufficiently adequate results to be justified economically. Optimum acceleration is obtained when the thin floating layer is from about a thirty-second to about a sixteenth of an inch in thickness. Thus the term "thin floating layer" as used in the specification and claims defines a layer of particles ranging in thickness from about a single layer to a layer of multiple particles having a thickness of about one-quarter inch.

Evaporation of volatile liquids from liquid media can be conducted over a broad range of temperatures and is frequently conducted at temperatures below the boiling point of such liquids; especially liquid media containing heat sensitive solids or liquids that precipitate out at elevated temperatures. The present invention is extremely effective for accelerating the rate of vaporization of volatile liquids below their boiling points, as for example, the evaporation of water at room temperatures or slightly elevated temperatures such as are obtained under solar evaporation conditions. Where so desired, it is possible to elevate the temperature of the evaporating media by introducing heat through coils submerged in the evaporating media or passing hot gases therethrough. In such cases it is desirable to use small particles that are thermally stable at the elevated temperatures. When the particles are used in connection with the solar evaporation of saline water, it is preferable to utilize black or very dark colored particles so as to absorb more of the sun's radiation and thereby more effectively utilize the solar energy for vaporization of the water.

The following examples are illustrative of the increased rate of evaporation of volatile liquids from liquid media that is obtained in practicing the invention. In the examples, synthetic sea water was used as the liquid media. Its composition and preparation was in accordance with the A.S.T.M. test (D665) of the American Society for Testing Materials. The particles used in the examples for accelerating the vaporization of water were white Colfoam Microballon Spheres of urea-formaldehyde resin having a particle size in the range of from about 2 to about 60 microns, with an average particle size of about 35 microns, and a bulk density of approximately 2.4 pounds per cubic foot. In each of the examples, approximately 400 ml. of the synthetic sea water was introduced into a 400 ml. tall-form beaker having a surface area of approximately 5 square inches. Control and test beakers having varying thicknesses of microspheres on their surfaces were exposed at room temperature for a period of 27 days, and the water loss through evaporation was ascertained at various time intervals during such period.

Example 1

In this example the synthetic sea water was covered with one gram of the micro-spheres, thereby producing a floating layer of the particles of about one-quarter inch in thickness. The average water loss for the blank (uncovered) and the test (covered) samples in duplicate, as well as the percent increase of evaporation due to covering the surface of the saline water undergoing evaporation, is shown in Table I. In this example and in succeeding examples, ΔT–B represents the number of grams of additional water evaporated by practicing this invention.

TABLE I

| Days Exposure | Water Loss in Grams | | | Percent Increased Evaporation |
|---|---|---|---|---|
| | Blank | Test | ΔT-B | |
| 5 | 51.6 | 61.6 | 10.0 | 19.3 |
| 10 | 91.6 | 117.8 | 26.2 | 28.6 |
| 17 | 145.8 | 191.9 | 46.1 | 31.6 |
| 27 | 215.0 | 273.7 | 58.7 | 27.3 |

*Example 2*

In this example the surface of the synthetic sea water was covered with 0.2 gram, giving a floating layer of approximately one-sixteenth of an inch in thickness. The effect of covering the evaporating surface with such a thin layer of the micro-spheres is shown in Table II.

TABLE II

| Days Exposure | Water Loss in Grams | | | Percent Increased Evaporation |
|---|---|---|---|---|
| | Blank | Test | ΔT-B | |
| 5 | 51.6 | 66.9 | 15.3 | 29.6 |
| 10 | 91.6 | 129.4 | 37.8 | 41.2 |
| 17 | 145.8 | 218.7 | 72.9 | 50.0 |
| 27 | 215.0 | 302.9 | 87.9 | 40.8 |

*Example 3*

In this example a surface of the synthetic sea water was covered with 0.1 gram of the micro-spheres, yielding a floating layer of approximately one-thirty-second of an inch in thickness. Evaporation losses are given in Table III.

TABLE III

| Days Exposure | Water Loss in Grams | | | Percent Increased Evaporation |
|---|---|---|---|---|
| | Blank | Test | ΔT-B | |
| 5 | 51.6 | 66.5 | 14.9 | 28.8 |
| 10 | 91.6 | 131.1 | 39.5 | 43.1 |
| 17 | 145.8 | 214.6 | 68.8 | 47.2 |
| 27 | 215.0 | 293.8 | 78.8 | 36.6 |

The above data show that by covering the surface of an aqueous liquid medium, such as saline water, with a thin floating layer of discrete, imperforate particles of an inert solid material preferentially wettable by water and having an average diameter of less than one centimeter and a density less than saline water, there is a substantial increase in the rate of vaporization of the water present in the saline water. The term "rate of vaporization" refers to the amount of volatile liquids (water) that is evaporated per unit time. Thus, the increased rate of vaporization obtained by means of the present invention is of commercial significance, for it is possible to evaporate from about 20 to about 50% more water at a given temperature than is possible in the absence of said layer.

The production of fresh water from saline water by means of solar evaporation is a simple and low-cost process. However, the effective utilization of solar stills for the production of fresh water from saline water by solar evaporation has been limited by the low rate of vaporization of water in the still. Inasmuch as solar stills are well known in the art, it is not necessary to describe them in detail. Briefly, the solar still is a distillation apparatus wherein water is vaporized and the vapor subsequently condensed either within or without the evaporating zone. Inasmuch as the rate of vaporization is dependent upon the amount of solar energy absorbed by the liquid undergoing evaporation in the still, various means have been suggested for increasing the rate of vaporization. For example, the depth of the body of water has been reduced; the bottom of the still has been constructed from black materials so as to increase the rate of absorption of the solar energy and thereby introduce more heat into the evaporating liquid. While these techniques have been of some benefit, they have been inadequate to sufficiently increase the rate of vaporization. Another problem associated with the operation of solar stills is the re-evaporation of the condensed fresh water collected in the evaporating-condensing zone or in a condensing zone exterior to the evaporating-condensing zone.

A specific embodiment of the present invention is a method for the production of fresh water from saline water. The method comprises exposing water vapor, by exposing a body of saline water having positioned on its surface a thin floating layer of discrete, imperforate particles of an inert solid material preferentially wettable by water to heat in an evaporating zone; collecting and condensing the water vapor so formed to obtain fresh water; and thereafter covering the surface of the condensed fresh water with a film of an ester, of a long straight-chain fatty alcohol, having the general formula:

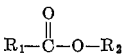

wherein $R_1$ is selected from the group consisting of hydrogen and an alkyl group having 1 to 2 carbon atoms, and $R_2$ is an alkyl group having from about 10 to about 36 carbon atoms, whereby evaporation of said condensed fresh water is retarded. This method is preferably conducted at atmospheric pressure with solar energy as the primary source of heat. Ancillary heat can be introduced into the process by means of warm water or other fluids or gases circulating through coils submerged in the body of saline water. A circulating aeriform fluid, such as air, may also be used in the vapor space above the upper surface of the floating layer of solid particles to assist in removal of the water vapor adjacent thereto to a condensing zone exterior to the evaporating zone.

The ester of a long-chain fatty alcohol, such as cetyl acetate, and its use as an evaporation retardant is fully described in our copending application S.N. 849,218, filed October 28, 1959, now abandoned, and the continuation-in-part application thereof, S.N. 223,291, filed September 10, 1962, now U.S. Patent 3,199,944; the disclosure of which to the extent it describes these esters and their use is incorporated by reference. Re-evaporation of the condensed fresh water can be retarded by covering the condensed water with a film of the ester in any known manner. These esters are self-spreading so that the intermittent application of the ester to the surface of the condensed water will quickly produce a monomolecular film and thereby retard re-evaporation of the water. For example, cetyl acetate, which is a liquid at room temperature, can be applied to the surface from a dropping applicator. Other means will be readily apparent to one skilled in the art.

Another specific embodiment of the present invention is an improvement in the solar evaporation process for the production of salt from saline water, which improvement comprises covering the surface of saline water in an evaporating zone with a thin floating layer of discrete, imperforate particles of an inert solid material preferentially wettable by water, whereby the rate of vaporization of water is accelerated at evaporation temperatures over the rate of vaporization in the absence of said layer. The solar evaporation process for the production of salt from saline waters, such as sea water, normally comprises exposing saline water in a series of ponds having increasing salt content up to saturation, whereby the salt crystallizes with additional evaporation of the water. The rate of production is dependent upon the number of ponds available. Consequently, it is desirable to increase the rate of production without attendant increase in the number of ponds. The present invention increases the rate of vaporization such that there is an attendant increase in the rate of production of salt. The practice of the present invention in connection with the solar evaporation process for the production of salt is preferably used in connection with those ponds having salt contents less than saturation, thereby alleviating the problem of separating the particles from the salt crystals obtained in the final evaporating zone or pond.

The term "saline water" as used in the specification and claims defines water having varying salt content, below saturation. For example, it includes brackish waters having a salt content of about 1,000 p.p.m., sea water and other natural waters having higher salt contents.

Thus, having described the invention, what is claimed is:

1. The method of accelerating the evaporation of water from a body of an aqueous liquid medium undergoing evaporation in an evaporating zone which comprises: covering the evaporating surface of a body of said medium with a thin floating layer of discrete, imperforate particles of an inert solid non-absorbent material having the surface thereof wettable by water, which particles have an average diameter of less than one centimeter and a density less than said liquid medium, whereby the rate of vaporization of said water is accelerated at a given temperature over the rate of vaporization in the absence of said layer.

2. The method of claim 1 wherein said aqueous liquid medium is saline water.

3. The method of claim 1 wherein said particles are spherical, hollow, gas-filled particles of urea-formaldehyde resin having an average diameter of less than 500 microns.

4. The method of claim 1 wherein said evaporation is conducted at temperatures below the boiling point of said aqueous liquid medium.

5. A method for the production of fresh water from saline water which comprises: forming water vapor by exposing a body of saline water having positioned on its evaporating surface a thin floating layer of discrete, imperforate particles of an inert solid non-absorbent material having the surface thereof wettable by water, which particles have an average diameter of less than one centimeter and a density less than water, to heat in an evaporating zone; collecting and condensing said water vapor to obtain fresh water; and thereafter covering the evaporating surface of said condensed fresh water with a film of an ester of a long straight chain fatty alcohol having the general formula:

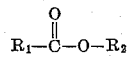

wherein $R_1$ is selected from the group consisting of hydrogen and an alkyl group having 1 to 2 carbon atoms, and $R_2$ is an alkyl group having from about 10 to about 36 carbon atoms, whereby evaporation of said condensed fresh water is retarded.

6. The method of claim 5 wherein said ester is an acetic acid ester of a long chain fatty alcohol having from about 10 to about 18 carbon atoms.

7. The method of claim 6 wherein said ester is cetyl acetate.

8. A method for the production of fresh water from saline water which comprises: introducing a body of saline water to an evaporating and condensing zone wherein water is vaporized, condensed and collected as fresh water; maintaining on the evaporating surface of the saline water in said zone a thin floating layer of discrete, imperforate particles of an inert solid non-absorbent material having the surface thereof wettable by water, which particles have an average diameter of less than one centimeter and a density less than said saline water, whereby the rate of vaporization of water is accelerated at a given temperature over the rate of vaporization in the absence of said layer; covering the evaporating surface of the collected fresh water in said zone with a film of an ester of a long straight chain fatty alcohol having the general formula:

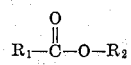

wherein $R_1$ is selected from the group consisting of hydrogen and an alkyl group having 1 to 2 carbon atoms, and $R_2$ is an alkyl group having from about 10 to about 36 carbon atoms, whereby evaporation of said collected fresh water is retarded; and continuously removing said fresh water from said zone.

9. In the method of manufacturing salt by solar evaporation of a body of saline water in an evaporating zone, the improvement which comprises: covering the evaporating surface of said body of saline water in said zone with a thin floating layer of discrete, imperforate particles of an inert solid non-absorbent material having the surface thereof wettable by water, which particles have an average diameter of less than one centimeter and a density less than said saline water, whereby the rate of vaporization of water is accelerated at evaporation temperatures over the rate of vaporization in the absence of said layer.

10. The method of claim 9 wherein said particles are spherical, hollow, gas-filled particles of urea-formaldehyde resin having an average diameter of less than 500 microns.

11. In the method of manufacturing salt by solar evaporation of a body of saline water wherein the salt content of the water is progressively increased by passage through a series of evaporating zones to a crystallizing zone, the improvement which comprises covering the evaporating surface of said water in each of said evaporating zones with a thin floating layer of discrete, imperforate particles of an inert solid non-absorbent material having the surface thereof wettable by water, which particles have an average diameter of less than one centimeter and a density less than said saline water, whereby the rate of vaporization of water is accelerated at a given temperature over the rate of vaporization thereof in the absence of said layer.

12. In the operation of a solar still for the production of fresh water from saline water, the improvement which comprises maintaining on the evaporating surface of the body of the saline water undergoing evaporation in said still a thin floating layer of discrete, imperforate particles of an inert solid non-absorbent material having the surface thereof wettable by water, which particles have an average diameter of less than one centimeter and a density less than saline water, whereby the rate of vaporization of said water is accelerated at a given temperature over the rate of vaporization in the absence of said layer.

References Cited by the Examiner

UNITED STATES PATENTS

| | | | |
|---|---|---|---|
| 2,275,117 | 3/1942 | Jorgensen | 159—49 |
| 2,764,533 | 9/1956 | Oetjen et al. | 202—64 |
| 2,797,141 | 6/1957 | Veatch | 21—60.5 |
| 2,903,330 | 9/1959 | Dressler | 21—60.5 |
| 3,036,880 | 5/1962 | Malkemus | 21—60.5 |
| 3,098,701 | 7/1963 | McCullough | 21—60.5 |
| 3,127,235 | 3/1964 | Benzel | 21—60.5 |
| 3,138,546 | 6/1964 | Muller | 203—10 |
| 3,146,060 | 8/1964 | Canevari | 21—60.5 |
| 3,147,067 | 9/1964 | Salyer | 21—60.5 |
| 3,199,944 | 8/1965 | Gabor et al. | 21—60.5 |

FOREIGN PATENTS 645,545   5/1937   Germany.

NORMAN YUDKOFF, *Primary Examiner.*

WILBUR L. BASCOMB, GEORGE D. MITCHELL,
*Examiners.*

M. H. SILVERSTEIN, *Assistant Examiner.*